US012525108B2

(12) United States Patent
Peters et al.

(10) Patent No.: US 12,525,108 B2
(45) Date of Patent: *Jan. 13, 2026

(54) SYSTEMS AND METHODS TO PROVIDE A PORTABLE ALARM

(71) Applicant: Birdie Love Inc., Berkeley, CA (US)

(72) Inventors: Alison Peters, Los Angeles, CA (US); Amy Ferber, Berkeley, CA (US)

(73) Assignee: Birdie Love Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,094

(22) Filed: Apr. 30, 2024

(65) Prior Publication Data

US 2024/0282183 A1 Aug. 22, 2024

Related U.S. Application Data

(63) Continuation of application No. 18/186,055, filed on Mar. 17, 2023, now Pat. No. 12,008,876, which is a continuation of application No. 17/230,929, filed on Apr. 14, 2021, now Pat. No. 11,636,747, which is a continuation of application No. 17/089,652, filed on Nov. 4, 2020, now Pat. No. 10,991,221.

(51) Int. Cl.

| | |
|---|---|
| ***G08B 15/00*** | (2006.01) |
| ***G08B 7/06*** | (2006.01) |
| *G08B 3/10* | (2006.01) |
| *G08B 5/22* | (2006.01) |

(52) U.S. Cl.

CPC ............. *G08B 15/004* (2013.01); *G08B 7/06* (2013.01); *G08B 3/1008* (2013.01); *G08B 5/22* (2013.01)

(58) Field of Classification Search

CPC ...... G08B 15/004; G08B 7/06; G08B 3/1008; G08B 5/22

USPC .......................................................... 340/687

See application file for complete search history.

(56) References Cited

U.S. PATENT DOCUMENTS 5,172,097 A * 12/1992 Arnold .................... E05B 67/38 70/DIG. 49
5,404,735 A * 4/1995 Hsieh ...................... E05B 67/24 70/DIG. 49
6,337,618 B1 * 1/2002 Craig ...................... E05B 67/22 340/5.22
7,325,425 B1 * 2/2008 Miller ..................... E05B 67/38 70/52

(Continued)

*Primary Examiner* — Brian A Zimmerman
*Assistant Examiner* — Thang D Tran
(74) *Attorney, Agent, or Firm* — Esplin & Associates, PC

(57) ABSTRACT

Systems and methods to provide a portable alarm, are disclosed herein. The system may include a top component that includes a connector, a first securing protrusion, and a second securing protrusion that extend out a bottom side of the top component; and a base component that includes a narrow cavity, a first notch, a second notch, and a battery-powered circuit board, the first securing protrusion, the second securing protrusion, and the connector engaging with or otherwise connecting with the first notch, the second notch, and the narrow cavity, respectively, to provide secure contact between the top component and the base component, the narrow cavity is linked to the battery-powered circuit board so that responsive to the connector being disengaged from the narrow cavity, an alarm is activated and responsive to the connector being engaged with the narrow cavity, the alarm is deactivated.

10 Claims, 5 Drawing Sheets

(56) References Cited

U.S. PATENT DOCUMENTS

| | | | | |
|---|---|---|---|---|
| 7,467,531 | B2 * | 12/2008 | Lai | E05B 37/025 70/432 |
| 9,115,511 | B1 * | 8/2015 | Schmidt | E05B 45/005 |
| 9,830,792 | B1 * | 11/2017 | Yang | G08B 13/2434 |
| 2003/0070453 | A1 * | 4/2003 | Gast | E05B 67/24 70/38 A |
| 2004/0035160 | A1 * | 2/2004 | Meekma | E05B 47/0673 70/278.3 |
| 2005/0145527 | A1 * | 7/2005 | Christensen | B25H 3/02 206/500 |
| 2006/0156769 | A1 * | 7/2006 | Yu | E05B 67/24 70/284 |
| 2006/0179903 | A1 * | 8/2006 | Goldman | E05B 47/026 70/278.7 |
| 2007/0074546 | A1 * | 4/2007 | Gogel | E05B 67/38 70/56 |
| 2007/0109136 | A1 * | 5/2007 | Hirooka | G08B 15/004 340/574 |
| 2007/0152836 | A1 * | 7/2007 | Nagelski | G08B 13/2448 340/572.9 |
| 2008/0190152 | A1 * | 8/2008 | Fontana | E05B 17/142 70/276 |
| 2008/0297367 | A1 * | 12/2008 | Chen | G08B 13/1409 340/687 |
| 2010/0141427 | A1 * | 6/2010 | Nott | G08B 13/1427 340/539.11 |
| 2013/0276487 | A1 * | 10/2013 | Burmesch | E05B 67/24 29/434 |
| 2013/0293368 | A1 * | 11/2013 | Ottah | G08B 23/00 340/426.1 |
| 2013/0313327 | A1 * | 11/2013 | Wu | E05B 17/0004 235/487 |
| 2014/0026626 | A1 * | 1/2014 | Lai | E05B 35/105 70/21 |
| 2014/0157838 | A1 * | 6/2014 | Nave | E05B 47/06 70/52 |
| 2015/0315822 | A1 * | 11/2015 | Garthe | E05B 73/0005 70/15 |

* cited by examiner

SYSTEMS AND METHODS TO PROVIDE A PORTABLE ALARM

FIELD OF THE DISCLOSURE

The present disclosure relates to systems and methods configured to provide a portable alarm.

BACKGROUND

Individuals often carry personal protection (e.g., mace, pepper spray, pocketknife) in unsafe circumstances. In such unsafe circumstances, the individuals may desire to activate an auditable and/or visual alarm as a deterrent to a threat and/or to draw attention of bystanders.

SUMMARY

One aspect of the present disclosure relates to a system configured to provide a portable alarm that may be activated responsive to disengagement of two components. The system may be in the form of a keychain or otherwise portable device comprising of two components, a top component and a base component, that may engage and disengage. Upon disengagement of the two components, (i.e., intentionally by a user), an alarm may be activated. Conversely, the alarm may be deactivated upon engagement of the two components.

The top component may include a connector, a first securing protrusion, and a second securing protrusion. The connector may extend out a center of a bottom side of the top component. The first securing protrusion may extend out of the bottom side of the top component adjacent to the connector. The second securing protrusion may extend out of the bottom side of the top component adjacent to the connector and opposite the first securing protrusion. The connector may be bare metal.

The base component may include a narrow cavity, a first notch, a second notch, and a battery-powered circuit board. An opening of the narrow cavity may be at a center of a top side the base component. The first notch may be adjacent to the opening of the narrow cavity. The second notch may be adjacent to the opening of the narrow cavity and opposite the first notch. As such, the first protrusion may engage with the first notch, the second protrusion may engage with the second notch, and the connector may engage with the narrow cavity to provide secure contact between the top component and the base component. The narrow cavity may be linked to the battery-powered circuit board. Thus, responsive to the connector being disengaged from the narrow cavity (e.g., by a user), an alarm may be activated. Conversely, responsive to the connector being engaged with the narrow cavity, the alarm may be deactivated.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
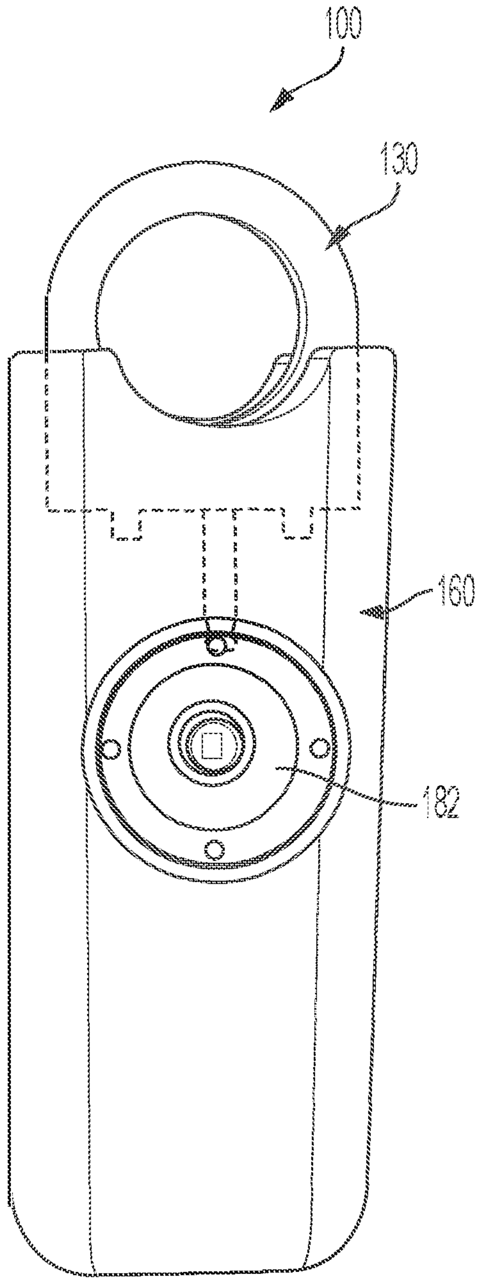
FIG. 1 illustrates a front view of a system configured to provide a portable alarm, in accordance with one or more implementations.

FIG. 1 illustrates a front view system 100 configured to provide a portable alarm, in accordance with one or more implementations. In some implementations, system 100 may be configured of one or more of type of plastic, silicon, metal, and/or other materials. The system 100 may be capable of being hooked onto one or more keys and/or keychains via a keychain ring (not pictured). In some implementations, system 100 may include a top component 130 and a base component 160, and/or other components.

Figure 2:
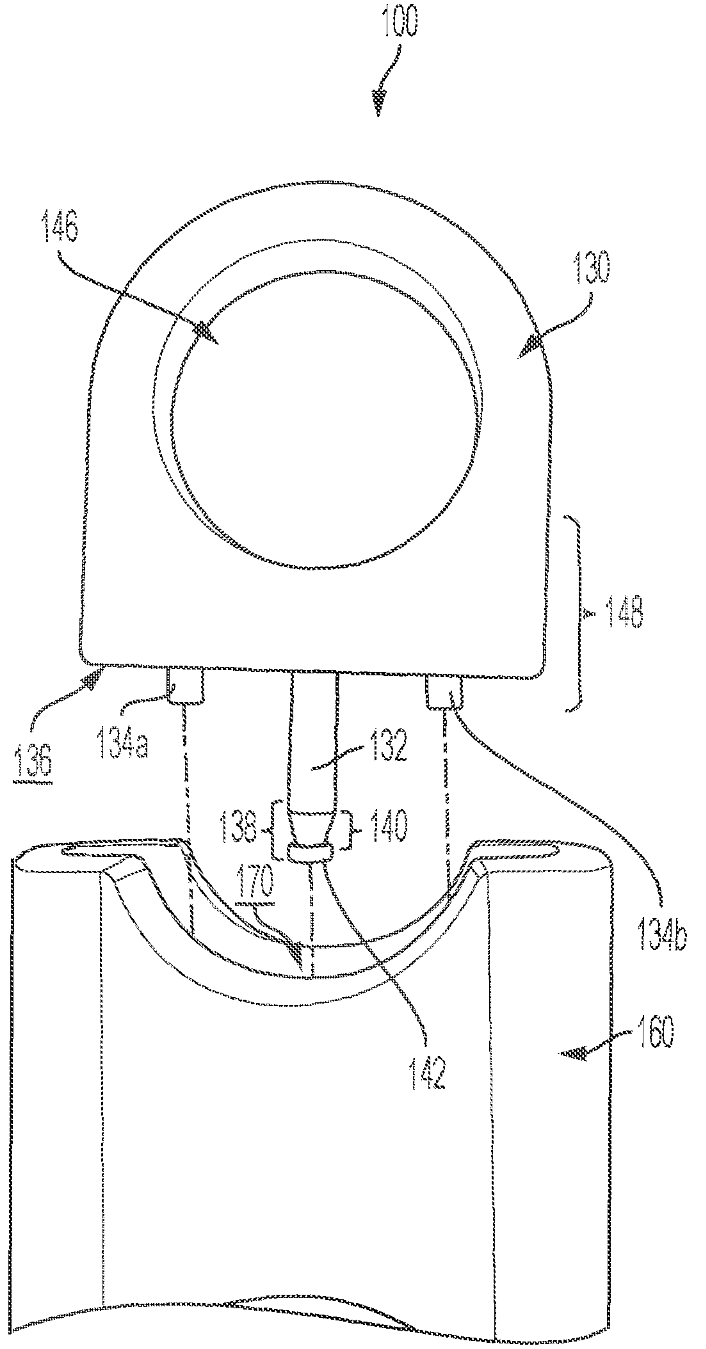
FIG. 2 illustrates a top component and a base component of the system configured to provide a portable alarm, in accordance with one or more implementations.
Figure 3:
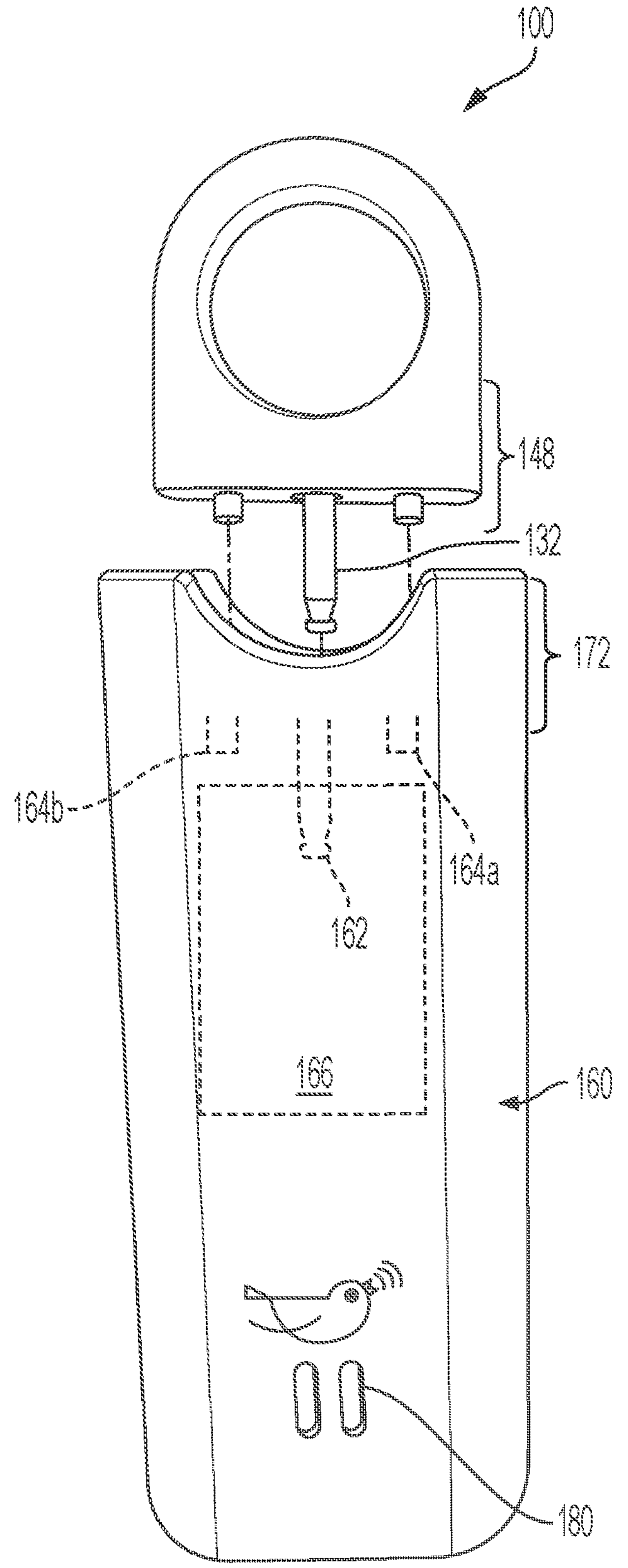
FIG. 3 illustrates a back view of the top component and the base component, in accordance with one or more implementations.
Figure 4:
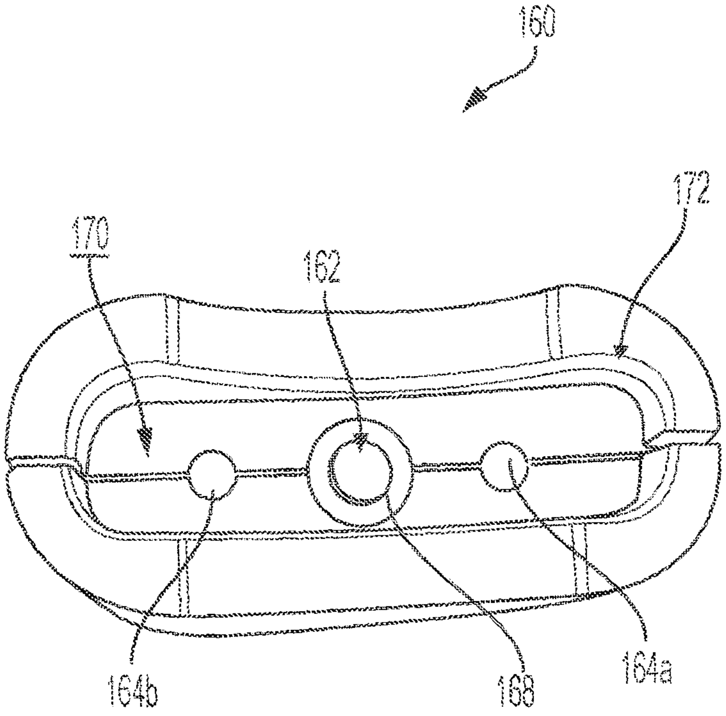
FIG. 4 illustrates a top side of the base component, in accordance with one or more implementations.

FIG. 2-4 may illustrate different views of top component 130 and a base component 160, and/or other components, in accordance with one or more implementations. FIG. 2-4 may be references simultaneously with FIG. 1 in description of system 100 herein.

Top component 130 may include a connector 132, a securing protrusion 134*a*, a securing protrusion 134*b*, and/or other components. Connector 132 may extend out a center of a bottom side 136 of the top component 130. Bottom side 136 may be at a bottom portion 148 of top component 130. Securing protrusion 134*a* may extend out of bottom side 136 adjacent to connector 132. Securing protrusion 134*b* may extend out of bottom side 136 adjacent to the connector 132 and opposite securing protrusion 134*a*.

Connector 132 may be bare metal and/or other materials. In some implementations, length of connector 132 may be about 10 millimeters, 11 millimeters, 11.5 millimeters, may be less than about, and/or may be within a range bounded at the upper end by a length in the former listing of length and bounded at the lower end by any length in the latter listing of lengths. In some implementations, connector 132 may be cylindrical, square-shaped, triangular, and/or other shapes at the length. Connector 132 may include an end portion 138 that is furthest from top component 130, particularly bottom side 136, from which connector 132 extends (see, FIGS. 2 and 3). End portion 138 may include a tapered section 140 and a rim 142 (see, FIG. 2). Rim 142 may be attached to tapered section 140 so that rim 142 is the furthest point from bottom side 136. In some implementations, securing protrusions 134*a-b* may be cylindrical, squared, triangular, and/or other shaped protrusions that correspond with a shape of notches of base component 160.

Referring to FIG. 2, in some implementations, top component 130 may include an annular opening 146. In some implementations, opening 146 may be square-shaped or other shaped opening. A keychain ring may be attached to system 100 via opening 146 to facilitate attachment of system 100 to one or more keys, lanyards, fingers of the user, and/or other items. In some implementations, bottom portion 148 of top component 130 may include a portion of the opening 146. That is, some of opening 146 is considered to be bottom portion 148.

Referring to FIGS. 3 and 4, base component 160 may include a narrow cavity 162, a notch 164*a*, a notch 164*b*, a battery-powered circuit board 166 (see, FIG. 3), and/or other components. An opening 168 of narrow cavity 162 may be at a center of a top side 170 of the base component 160. Notch 164*a* may be adjacent to the opening 168 of the narrow cavity 162. Notch 164*b* may be adjacent to the opening 168 and opposite notch 164*a*. As such, securing protrusion 134*a* may engage with notch 164*a*, securing protrusion 134*b* may engage with notch 164*b*, and connector 132 may engage with narrow cavity 162 to provide secure contact between top component 130 and base component 160. Engagement between securing protrusions 134*a-b* and notches 164*a-b*, respectively, and between connector 132 and narrow cavity 162 may refer to securing protrusions 134*a-b* and connector 132 by entering their respective part of base component 160 to ensure that any rotational movement of top component 130 and/or separation of top component 130 from base component 160 does not occur during engagement unless intentionally separated by a user (i.e., the user pulls top component 130 and base component 160 apart from each other to disengage them). In some implementations, notches 164*a-b* may be cylindrical, squared, triangular, and/or other shaped notches that correspond with the shape of the securing protrusions 134*a-b*.

Narrow cavity 162 may be linked to battery-powered circuit board 166. Based on the linkage between battery-powered circuit board 166 and narrow cavity 162, an alarm may be activated or deactivated. An activated alarm may refer to and include one or more of a sound 180 (see, FIG. 3), a light 182 (see, FIG. 1), and/or other alarms that may deter a threat and/or draw attention to system 100. In some implementations, light 182 may be an LED light and/or other bright light. The sound may be unpleasant, loud, high pitch, repetitive, and/or other characteristics. In some implementations, the sound may be greater than about 120 decibels, 130 decibels, 140 decibels, may be less than about, and/or may be within a range bounded at the upper end by any loudness of sound in the former listing of loudnesses of sound and bounded at the lower end by any loudness of sound in the latter listing of loudness of sound.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of +2 decibels of the given numeric value provided such a deviation does not alter the end function or result of the value. Therefore, a value of about 130 decibels can be construed to be a range from 128 decibels to 132 decibels. Furthermore, a range may be construed to include the start and the end of the range. For example, a range of 120 decibels to 140 decibels (i.e., range of 120-140 decibels) includes 120 decibels and also includes 140 decibels, as well as decibels in between 120 decibels and 140 decibels, unless explicitly stated otherwise herein.

A deactivated alarm may refer to an absence of the sound 180, the light 182, and/or other alarms so that the alarm, and thus system 100, is in an idle mode. Responsive to connector 132 being disengaged from narrow cavity 162 (e.g., by a user), the alarm may be activated. Conversely, responsive to connector 132 being engaged with narrow cavity 162, the alarm may be deactivated. Connector 132 may be disengaged from narrow cavity 162 by the user pulling top component 130 and base component 160 apart or in opposite directions. Connector 132 may be engaged with narrow cavity 162 by the user placing connector 132 into opening 168 so that connector 132 in its entirety enters narrow cavity 162 and simultaneously, securing protrusions 134*a-b* may be entered into notches 164*a-b*, respectively, to secure attachment of top component 130 to base component 160.

In some implementations, base component 160 may include a lip 172 that encases bottom portion 148 of top component 130 to further prevent rotational movement of top component 130 (see, FIG. 3-4). As such, bottom portion 148 may be tightly covered by lip 172 while securing protrusions 134*a-b* are engaged with notches 164*a-b*, respectively, and while connector 132 is engaged with narrow cavity 162 (i.e., top side 170 contacting bottom side 136).

Figure 5:
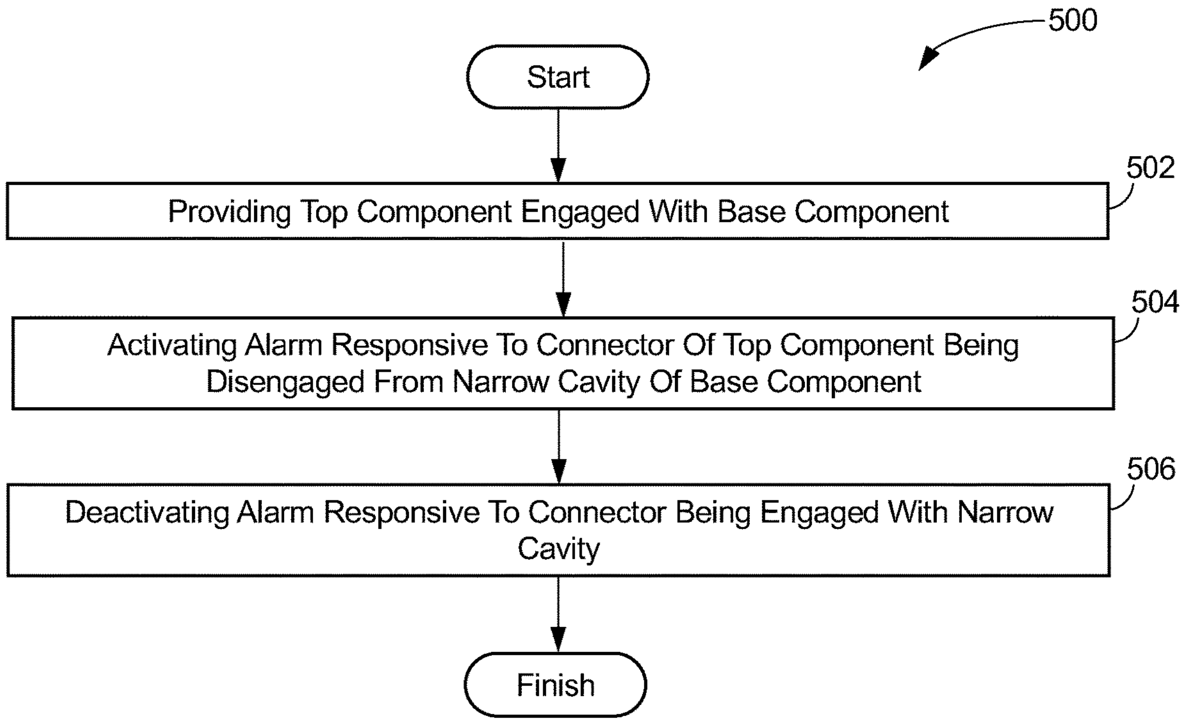
FIG. 5 illustrates a method to provide a portable alarm, in accordance with one or more implementations.

FIG. 5 illustrates a method 500 to provide a portable alarm, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

An operation 502 may include a top component engaged with a base component. The top component may include a connector, a first securing protrusion, a second securing protrusion, and/or other components (See, descriptions for connector 132, securing protrusion 134*a*, securing protrusion 134*b*, and/or other components as referenced in FIG. 1-4). The base component may include a narrow cavity, a first notch, a second notch, a battery-powered circuit board, and/or other components (See, descriptions for narrow cavity 162, notch 164*a*, notch 164*b*, battery-powered circuit board 166, and/or other components as referenced in FIG. 1-4).

An operation 504 may include activating the alarm. The alarm may be activated responsive to the connector being disengaged from the narrow cavity (e.g., by a user). The alarm may include a sound, a light, and/or other alarms that may deter a threat and/or draw attention to deter the threat.

An operation 506 may include deactivating the alarm. The alarm may be deactivated responsive to the connector being engaged with the narrow cavity (e.g., by the user). The alarm may be idle or otherwise silent when the connector is engaged with the narrow cavity.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a portable alarm, the system comprising:

an annular top component having a bottom side;

a base component with a first end and a second end opposite the first end;

a connector sub-component which connects the annular top component to the base component, the connector sub-component extending from the bottom side of the annular top component into the base component at the first end;

wherein the first end is formed with:

a lip that encases a portion of the annular top component to prevent rotational movement of the annular top component relative to the base component while permitting translational movement of the annular top component relative to the base component; and wherein the connector sub-component is linked to a battery-powered circuit board so that:

responsive to the translational movement of the annular top component being away from the base component, an alarm is activated, and responsive to the translational movement of the annular top component being toward the base component, the alarm is deactivated.

2. The system of claim 1, wherein the connector sub-component is about 10 millimeters in length.

3. The system of claim 1, wherein the connector sub-component includes an end having a rim.

4. The system of claim 1, wherein the alarm includes a sound and/or a light.

5. The system of claim 4, wherein the sound is 130 decibels.

6. A method to manufacture a portable alarm, the method comprising:

forming an annular top component having a bottom side;

forming a base component with a first end and a second end opposite the first end;

forming a connector sub-component which connects the annular top component to the base component, the connector sub-component extending from the bottom side of the annular top component into the base component at the first end;

forming the first end of the base component with a lip that encases a portion of the annular top component to prevent rotational movement of the annular top component relative to the base component while permitting translational movement of the annular top component relative to the base component; and wherein the connector sub-component is linked to a battery-powered circuit board that activates or deactivates an alarm, such that:

responsive to the translational movement of the annular top component being away from the base component, activating the alarm; and responsive to the translational movement of the annular top component being toward the base component, deactivating the alarm.

7. The method of claim 6, wherein the connector sub-component is about 10 millimeters in length.

8. The method of claim 6, wherein the connector sub-component includes an end having a rim.

9. The method of claim 6, wherein the alarm includes a sound and/or a light.

10. The method of claim 9, wherein the sound is 130 decibels.

* * * * *